(No Model.)

J. A. GORLY.
CHECK REIN HOOK.

No. 334,769. Patented Jan. 26, 1886.

Attest

Inventor:
John A. Gorly

UNITED STATES PATENT OFFICE.

JOHN A. GORLY, OF PATTONVILLE, MISSOURI.

CHECK-REIN HOOK.

SPECIFICATION forming part of Letters Patent No. 334,769, dated January 26, 1886.

Application filed October 9, 1885. Serial No. 179,454. (No model.)

*To all whom it may concern:*

Be it known that I, JOHN A. GORLY, a citizen of the United States, residing at Pattonville, in the county of St. Louis and State of Missouri, have invented a new and useful Check-Rein Hook, of which the following is a specification.

My invention relates to improvements in check-rein hooks for harness, and the objects of my improvements are, first, to provide a check-rein hook that shall have a longitudinally-yielding movement for the purpose of reciprocating the head and neck motion of the animal; and, second, to so construct a check-rein hook that in case the animal stumbles or plunges, the quick and heavy strain upon the check-rein will cause the check-rein hook to straighten or open and release the check-rein without breaking or tearing the harness or check-hook. I attain these objects by the mechanism illustrated in the accompanying drawings, in which—

Figure 1:
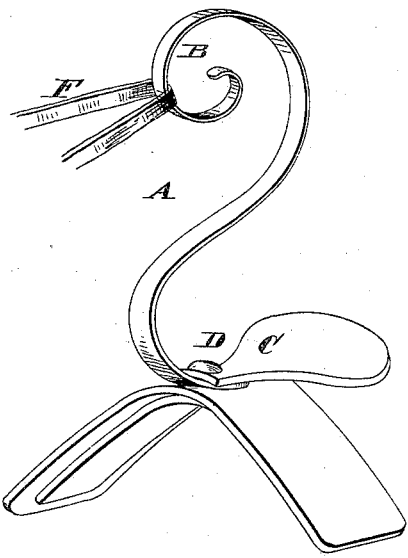
Figure 2:
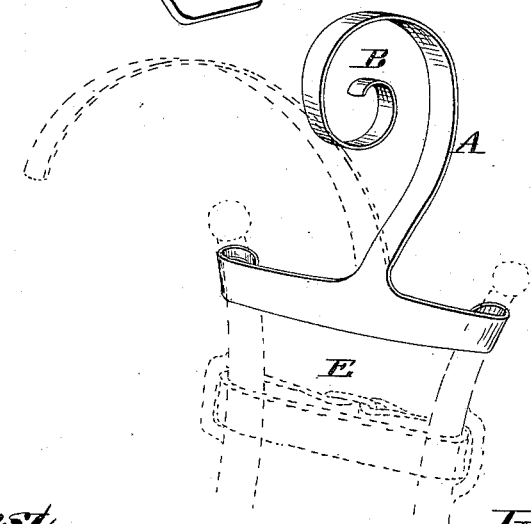

Figure 1 is a perspective view of my improved check-rein hook attached to a gig-saddle. Fig. 2 is a perspective view of my improved check-rein hook attached to hames.

Similar letters refer to similar parts throughout the several views.

A represents my improved check-rein hook, which in the present instance is made of spring-steel, though any other suitable elastic flexible material may be used.

B is the loop which retains the check-rein F, and is preferably curved forward of the shank, in order to readily release the check-rein F when strained without breaking or tearing the harness.

C is the ordinary gig-saddle, as used on the back-band of harness.

The check-rein hook A is permanently attached to the gig-saddle C or back-band of harness by inserting the bolt or rivet D through the parts required and the hole G in the shank of the hook A, and securing the same together.

The hook A is applicable for use on various parts of harness—viz., the gig-saddle, back-band, longitudinal back-strap, or hames.

The adaptation of my check-hook is shown in Fig. 1.

In Fig. 2 the hook A is shown as adjusted to hames E, the dotted lines showing the expansion of the hook, with loop B distended, as in the event of a sudden hard jerk on the check-rein occasioned by the falling or stumbling of the animal, which causes the check-hook A to release the check-rein F without injury to the harness or check-rein hook.

If desired, my check-rein hook may be made strong enough to retain the check-rein unless the animal falls, and merely yield in case the animal stumbles, and by its reciprocating motion aid in recovering the proper position. This hook may be tapered from the shank to its free end, either in thickness or width, or both, and the number of coils encircling the loop B may be increased or lessened at the option of the maker, without departing from the spirit of my invention, so long as said loops are curved forward of the shank, as shown in Fig. 1, and the shank or lower part of the hook may be shaped to conform to any of the desired requirements for practical use.

It is to be understood that I am not to limit myself to any precise form or size of the hook A, or manner of applying it, so long as its office is substantially the same, in combination with the required parts of harness.

If desired, my improved check-rein hook may be constructed of non-flexible metal, and provided with a joint near its shank having a coil or other compression spring to admit of a longitudinally yielding and reciprocating motion, and I reserve the right to claim this latter plan of construction in a subsequent application.

It is obvious that the longitudinally yielding and reciprocating motion afforded by my improved check-rein hook tends greatly to the relief of the animal as well as the preservation of the harness, as compared to the old styles of stationary check-rein hooks, as a rigid unyielding connection of the harness from the bridle to the crupper, occasioned by "checking-up" the animal, produces friction galls or abrasions in the mouth, on the back, and at any spot where the harness comes in contact with the skin of the animal. My present invention entirely obviates this objection by reason of its longitudinally yielding and reciprocating motion, while the harness will not be torn or broken should the animal plunge or fall forward as the hook A and loop B straighten or distend under strong pressure, as shown in Fig. 2, and release the check-rein F.

The loop B of the hook A is curved forward in order to readily release the check-rein F when distended, and is about six inches above the shank, but may be arranged at any suitable height desired. This arrangement, however, prevents the chafing of the withers, or the mane becoming entangled with the check-rein F, which is hooked directly into the loop B, thus obviating the use and expense of a cumbersome extra check-hook, which also involves the use of anti-friction rollers, &c., as required by the ordinary kinds now in use, and which are not self-releasing, so that breakage of the harness under a strong pressure cannot be avoided. The hook A is curved forward and tempered to a flexibility that admits of distention enough under a strain to release the check-rein F and prevent breakage.

In addition to the utility of my improved check-rein hook, when properly finished, it serves as an ornament to the harness.

I am aware that numerous devices have been arranged to relieve the rigidity of the check-rein by longitudinally-yielding hooks and springs, and therefore I do not claim such a device, broadly; but I am not aware of any device that combines the yielding reciprocating motion and self-releasing check-rein hook, so adjusted and arranged as to effectually prevent the check-rein from rubbing the mane and withers—a feature especially desirable in the fly season.

Having thus fully described my invention, what I claim, and desire to secure by Letters Patent, is—

1. The elastic self-releasing check-rein hook A, having the elevated forwardly-curved expansion-rein loop B, substantially as shown and for the purpose specified.

2. The self-releasing check-rein hook A, having the elevated expansion-rein loop B, in combination with the saddle C, substantially as shown.

In testimony that I claim the foregoing I have hereunto set my hand this 3d day of October, 1885.

JOHN A. GORLY.

In presence of—
PETT BABB,
JNO. C. MATHEWS.